United States Patent
Rose et al.

(10) Patent No.: US 7,184,717 B2
(45) Date of Patent: Feb. 27, 2007

(54) PORTABLE COMMUNICATION DEVICE HAVING A MEMS SWITCH AND METHOD THEREFOR

(75) Inventors: Bruce W. Rose, Aloha, OR (US); Evan R. Green, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 10/039,461

(22) Filed: Dec. 28, 2001

(65) Prior Publication Data

US 2003/0124986 A1    Jul. 3, 2003

(51) Int. Cl.
*H04B 1/44* (2006.01)
(52) U.S. Cl. .................... 455/83; 455/88; 455/574; 455/575.7; 455/300; 455/562.1; 343/702; 343/895; 370/277

(58) Field of Classification Search ............... 455/83, 455/88, 127.4, 41.2, 500, 574, 575.7; 330/127, 330/134, 279; 327/308, 427; 343/702, 895; 370/277
See application file for complete search history.

(56) References Cited

U.S. PATENT DOCUMENTS

| | | | |
|---|---|---|---|
| 6,204,819 B1 * | 3/2001 | Hayes et al. | 343/702 |
| 6,496,150 B1 * | 12/2002 | Li et al. | 343/702 |
| 6,531,668 B1 * | 3/2003 | Ma | 200/181 |
| 6,611,696 B2 * | 8/2003 | Chedester et al. | 342/359 |
| 6,615,033 B1 * | 9/2003 | Cragun | 455/502 |
| 6,643,522 B1 * | 11/2003 | Young | 455/552.1 |
| 6,647,257 B2 * | 11/2003 | Owensby | 455/414.1 |
| 6,654,362 B1 * | 11/2003 | Palamara | 370/332 |
| 6,658,264 B1 * | 12/2003 | Irvin | 455/552.1 |
| 6,714,800 B2 * | 3/2004 | Johnson et al. | 455/561 |
| 6,741,871 B1 * | 5/2004 | Silverbrook et al. | 455/557 |
| 6,816,711 B2 * | 11/2004 | Standke et al. | 455/73 |

* cited by examiner

*Primary Examiner*—Marceau Milord
(74) *Attorney, Agent, or Firm*—Stuart A. Whittington

(57) ABSTRACT

Briefly, in accordance with one embodiment of the invention, a portable communication device includes a microelectromechanical system (MEMS) device to couple an antennae from a first and second transceiver.

14 Claims, 1 Drawing Sheet

PORTABLE COMMUNICATION DEVICE HAVING A MEMS SWITCH AND METHOD THEREFOR

BACKGROUND

Portable communication devices such as, for example, cell-phones, typically have an antennae connected to a transceiver. The antennae may be used by the transceiver to both transmit and receive radio frequency (RF) signals. The portable communication device typically includes field effect transistors (FETs) that are used to connect/disconnect the transmit and receive paths from the antennae at the appropriate time. However, the FETs are not perfect switches. During transmission mode, the FETs may result in some signal loss and during isolation mode the FETs may result in some unwanted signal coupling. As a result, the transmission power level is increased to compensate for the FETs, which, in turn, may result in a higher power consumption/lower battery life for the portable communication device. Similarly, while in receive mode, the FETs may undesirably attenuate the received signal, which, in turn, may involve additional received signal amplifiers and increased power consumption with the associated issues.

Thus, there is a continuing need for better ways to reduce the power consumption of FETs associated with connecting a transceiver to an antennae in a portable communication device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

The sole FIGURE is a schematic representation of a portion of a portable communication device in accordance with an embodiment of the present invention;

Figure 1:
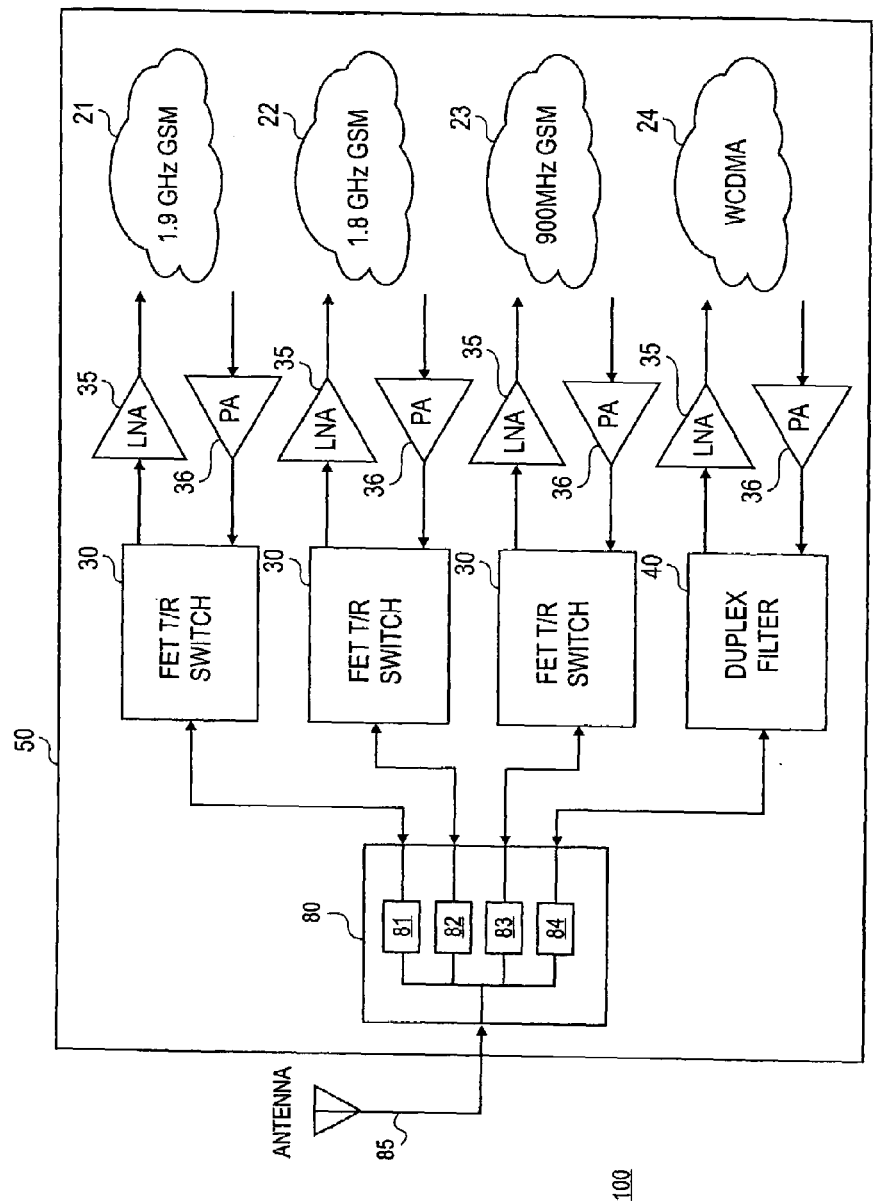

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included Within the scope of the present invention include, by way of example only, cellular radiotelephone communication systems, satellite communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like. Although the scope of the present invention is in no way limited to this particular list.

Turning to FIG. 1, an embodiment 100 in accordance with the present invention is described. Embodiment 100 may comprise a portable communication device 50 such as a mobile communication device (e.g., cell phone), a two-way radio communication system, a one-way pager, a two-way pager, a personal communication system (PCS), a portable computer, or the like, of which only a portion is shown in the FIGURE. Although it should be understood that the scope and application of the present invention is in no way limited to these examples.

As will be explained in more detail below, portable communication device 50 may include transceivers or base band modules 21–24 that may be used to process communications signals associated with particular frequencies and/or communication protocols. However, it should be understood that the scope of the present invention is not limited to base band modules associated with cellular phones. Alternative embodiments of the present invention may include any wireless application where one or more transmitters, receivers, or transceivers are using an antennae to transmit or receive wireless signals. As will be explained in more detail below, an electrically enabled mechanical switch may be used to couple and de-couple an antennae from signal path in the wireless communication device. Further, the location of the mechanical switch may be varied as desired.

For example, although the scope of the present invention is not limited in this respect, portable communication device 50 may include base band modules 21–24. Base band modules may include all or part of the signal processing capability of portable communication device 50. Although the scope of the present invention is not limited in this respect, base band modules 21–24 may be used to communicate using RF signals with different frequencies such as 1.8–1.9 GHz or 800–900 MHz, or using various communication protocols such as, but not limited to, any of those cellular radiotelephone communication systems listed earlier. However, it should be understood that the scope of the present invention is not limited to base band modules that operate at a particular frequency or use a particular communication protocol. Further, the scope of the present invention is not limited to the particular number of base band modules that are included within portable communication device 50. For example, although four base band modules 21–24 are shown in the FIGURE, alternative embodiments could have more or less or even just one base band module.

In this particular embodiment, portable communication device 50 may also include an antennae 85, a microelectromechanical system (MEMS) switch bank 80, field effect transistors (FET) transmit/receive switches 30, a duplex filter 40, low noise amplifiers (LNAs) 35 and power amplifiers (PA) 36. Although the scope of the present invention is not limited in this respect, MEMS device bank 80 may comprise multiple MEMS switches 81–84 that may be electrically enabled devices that are used to couple/decouple the signal processing portion of portable communication device from antennae 85. For example, MEMS switches 81–84 may be connected to antennae 85 at an input terminal and one of FET's 30 or duplex filter 40 at an output terminal. Thus, if a particular switch is enabled, it may electrically connect antennae 85 to the circuitry of the corresponding base band module 21–24.

MEMS switches 81–84 may be a variety of electrical and/or mechanical switches. For example, although the scope of the present invention is not limited in this respect, MEMS switches 81–84 may be cantilever sensors, moveable gate sensors, moveable mass sensors, capacitively coupled sensors, and the like. Such switches may provide for physical isolation between an input and an output terminal of the switch. For example, MEMS switches 81–84 may comprise a cantilever that moves between a first and second position depending on an electrically generated enable signal. While in the first position, the cantilever may electrically connect the corresponding FET switch 30 to antennae 85, and provide physical and electrical isolation between the two while in the second position. Although the scope of the present invention is not limited in this respect, the switches may be electrically enabled such that a processor, control circuitry, or even a user may enable the switch, and thus, control the communication mode used by portable communication device 50.

Because MEMS switches 81–84 may provide physical isolation in the signal path between antennae 85 and the corresponding transceiver (i.e. base band modules 21–24), portable communication device 50 may suffer from less attenuation or signal loss. Consequently, portable communication device 50 may consume less power, and thus, have a longer battery life.

In this particular embodiment, MEMS switches 81–84 may coupled one of FET switches 30 or duplex filter 40 to antennae 85. FET switches 30 may then couple and decouple the transmit and receive paths of the corresponding transceiver to antenna 85. In this particular example, the receive path may include a low noise amplifier (LNA) 35 and the transmit path may include a power amplifier (PA) 36. Because of the frequency at which these changes may occur, it may be desirable for to use solid state devices for FETs switches 30, although in alternative embodiments, MEMS switches may be used instead.

Similarly, MEMS switch 84 may couple duplex filter 40 to antennae 85 to base band module 24. Some communication protocols such as, for example, wide band code division multiple access (WCDMA) transmit and receive signals at the same time. Thus, duplex filter 40 may be used since both the transmit and receive paths are coupled to antennae 85 at the same time. Thus, a FET switch 30 may not be used, although the scope of the present invention is not limited in this respect.

As mentioned above, MEMS switches 81–84 may be one of a variety of electrical/mechanical switches. For example, MEMS switches 81–84 may be a Microrelay available from Cronos Inc. Although the scope of the present invention is not limited in this respect, MEMS switches 81–84 may be discrete components that are packaged separately from FET switches 30. However, in alternative embodiments, MEMS switches 81–84 may be contained within the same package as all or part of the corresponding transceiver (i.e. same package as FET switch 30, LNA 35, PA 36, and/or base band module 21). Further, in yet other embodiments, MEMS switches 81–84 may be manufactured within the same semiconductor substrate as all or part of the corresponding transceiver (i.e. same package as FET switch 30, LNA 35, PA 36, and/or base band module 21).

Thus, in this particular embodiment, MEMS switches 81–84 may provide desirable electrical isolation and insertion loss as portable communication device 50 switches between different bands or modes of communication. The electrical isolation and insertion loss may reduce the power consumption of portable communication device 50 and/or extend its battery life.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A portable communication device comprising:
   a first transceiver;
   a first microelectromechanical system (MEMS) switch to couple the first transceiver to an antennae, wherein the first MEMS switch has an input node directly connected to the antennae; and
   a field effect transistor switch coupled to an output of the first MEMS switch.

2. The portable communication device of claim 1, wherein the field effect transistor switch and the first MEMS switch are contained within the same package.

3. The portable communication device of claim 2, wherein the field effect transistor switch and the first MEMS switch are contained within the same semiconductor substrate.

4. The portable communication device of claim 1, further comprising:
   a second transceiver; and
   a second MEMS switch to couple the second transceiver to the antennae.

5. The portable communication device of claim 4, wherein the first transceiver and the second transceiver are adapted to communicate at about 1.9 GHz, 1.8 GHz, or 900 MHz.

6. The portable communication device of claim 1, wherein the first MEMS switch includes a cantilever adapted to move to a first position to couple the antennae to the first transceiver.

7. The portable communication device of claim 6, wherein the cantilever of the first MEMS switch is adapted to move to a second position to disconnect the antennae from the first transceiver.

8. A portable communication device comprising:
   an antennae;
   a first mechanical switch that is enabled with an electrical signal;
   a first transceiver, wherein the first mechanical switch is adapted to couple the first transceiver to the antennae;

a second mechanical switch that is enabled with an electrical signal;

a second transceiver, wherein the second mechanical switch is adapted to coupled the second transceiver to the antennae; and a first field effect transistor switch coupled to the first mechanical switch.

9. The portable communication device of claim 8, wherein the first field effect transistor switch and the first mechanical switch are both formed in the same semiconductor substrate.

10. The portable communication device of claim 8, further comprising a first base band module adapted to process signals at a first frequency, the first base band module coupled to the antennae when the first mechanical switch is enabled.

11. The portable communication device of claim 10, wherein at least a portion of the first base band module and the first mechanical switch are formed on the same semiconductor substrate.

12. The portable communication device of claim 10, further comprising a second base band module adapted to process signals at a second frequency, the second base band module coupled to the antennae when the second mechanical switch is enabled.

13. The portable communication device of claim 12, wherein the first frequency is at least twice the second frequency.

14. The portable communication device of claim 12, wherein the first frequency is about 1.9 GHz.

* * * * *